United States Patent [19]
Rorden

[11] 3,781,664
[45] Dec. 25, 1973

[54] MAGNETIC DETECTION FOR AN ANTI-SHOPLIFTING SYSTEM UTILIZING COMBINED MAGNETOMETER AND GRADIOMETER SIGNALS

[75] Inventor: Louis H. Rorden, Menlo Park, Calif.
[73] Assignee: Develco, Inc., Mountain View, Calif.
[22] Filed: Oct. 24, 1972
[21] Appl. No.: 299,695

[52] U.S. Cl............. 324/43 R, 324/41, 340/258 C, 340/258 D, 340/280
[51] Int. Cl............................................ G01r 33/04
[58] Field of Search................. 324/43 R, 43 G, 67, 324/47, 41; 340/197, 258 R, 258 C, 258 D, 280; 33/361

[56] References Cited
UNITED STATES PATENTS
3,292,080  12/1966  Trikilis................................. 324/41
3,423,674  1/1969  Goldsmith et al.................... 324/45
3,665,449  5/1972  Elder et al.......................... 340/280

*Primary Examiner*—Robert J. Corcoran
*Attorney*—Harvey G. Lowhurst et al.

[57] ABSTRACT

A magnetic surveillance system useful for detecting unauthorized removal of magnetically marked objects through a surveillance region includes at least one and preferably two three axis fluxgate type magnetometer-gradiometer sensors proximate the region to be monitored such as at an exit. Both the magnetometer and gradiometer signals are processed by appropriate algorithms to derive outputs proportional to the magnetic moment of and range to a magnetic anomaly within the region under surveillance. Minimum and maximum threshold values are prescribed for the detected magnetic moment to provide a window encompassing the magnetic moment of the marker to be detected while excluding other magnetic moments which could lead to a false alarm. A range threshold is set to exclude indication of magnetic moments outside of the region under surveillance.

23 Claims, 19 Drawing Figures

PATENTED DEC 25 1973 3,781,664
SHEET 1 OF 6
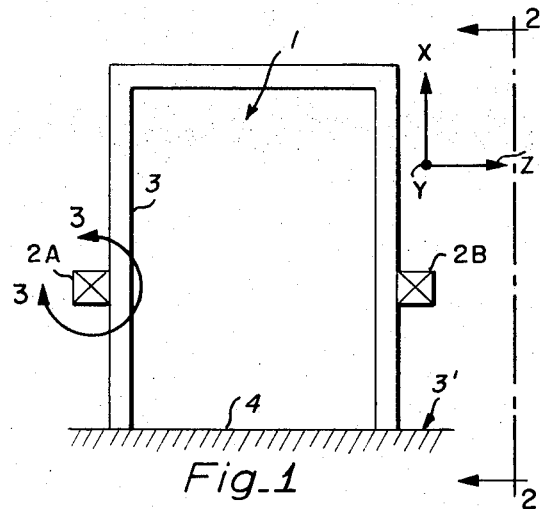
Fig_1
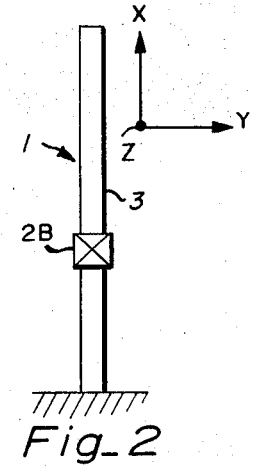
Fig_2
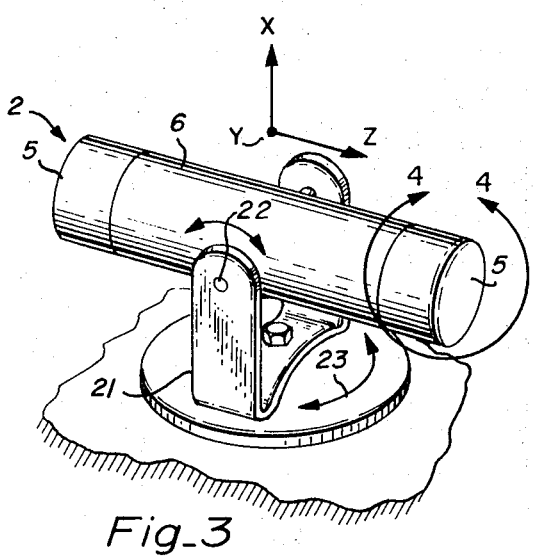
Fig_3
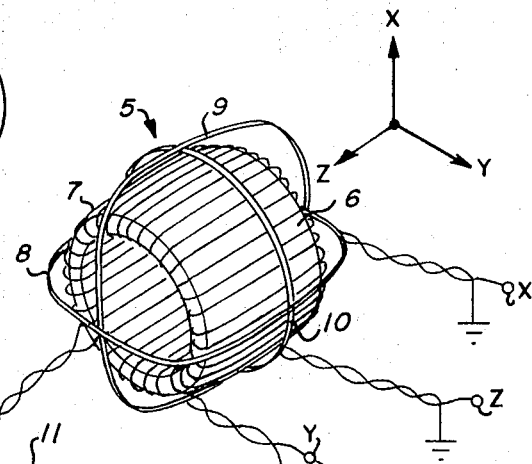
Fig_4
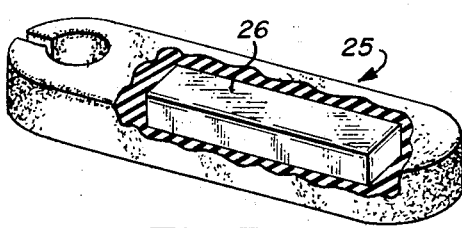
Fig_5

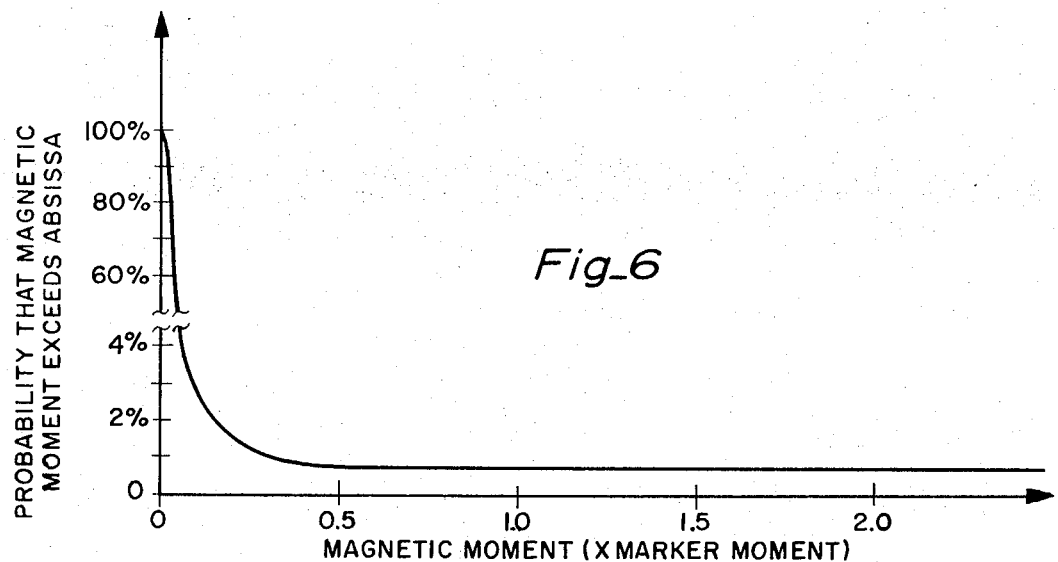
Fig_6
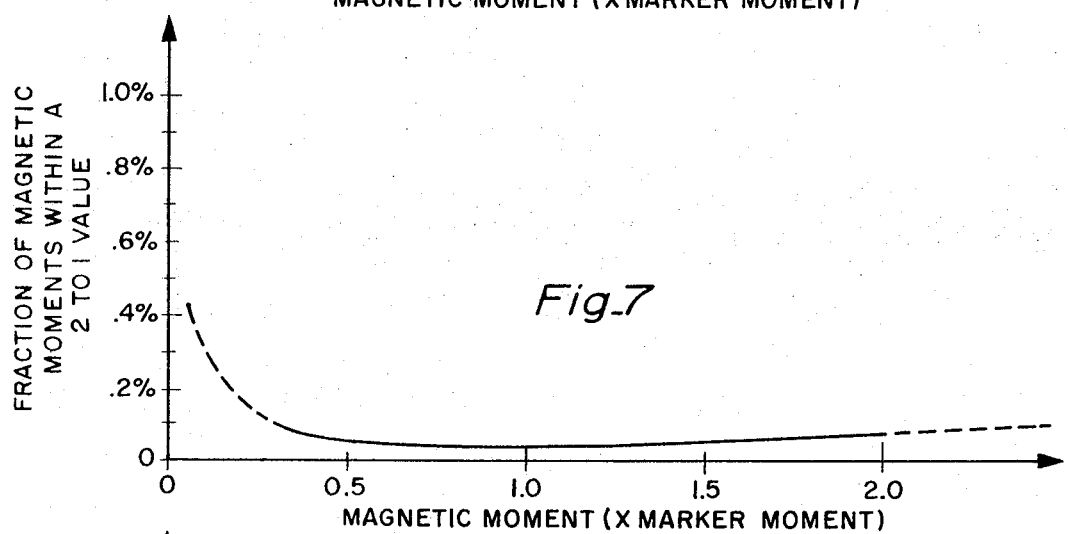
Fig_7
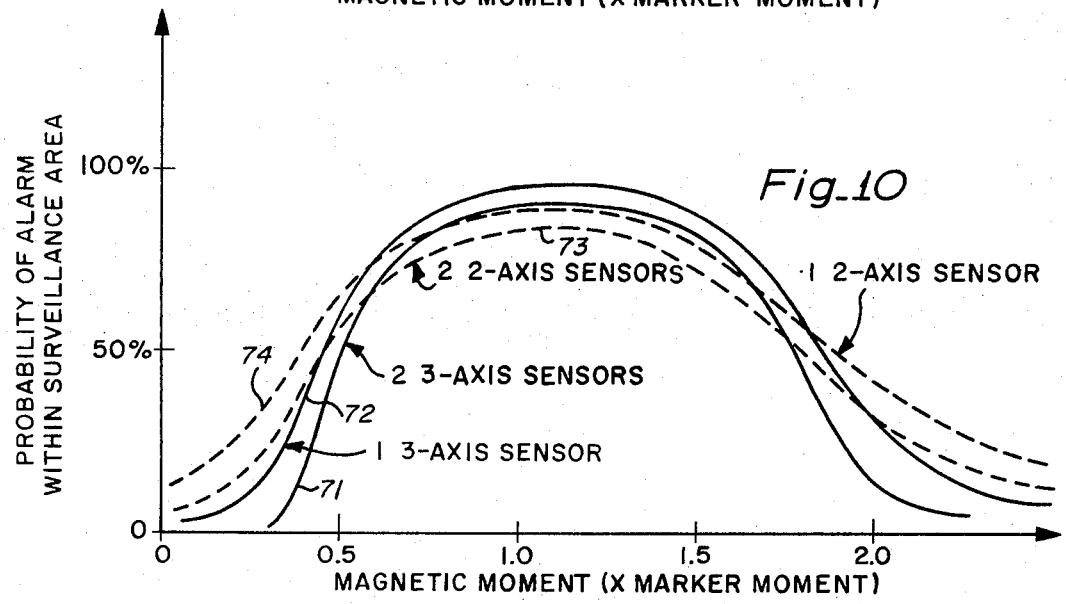
Fig_10

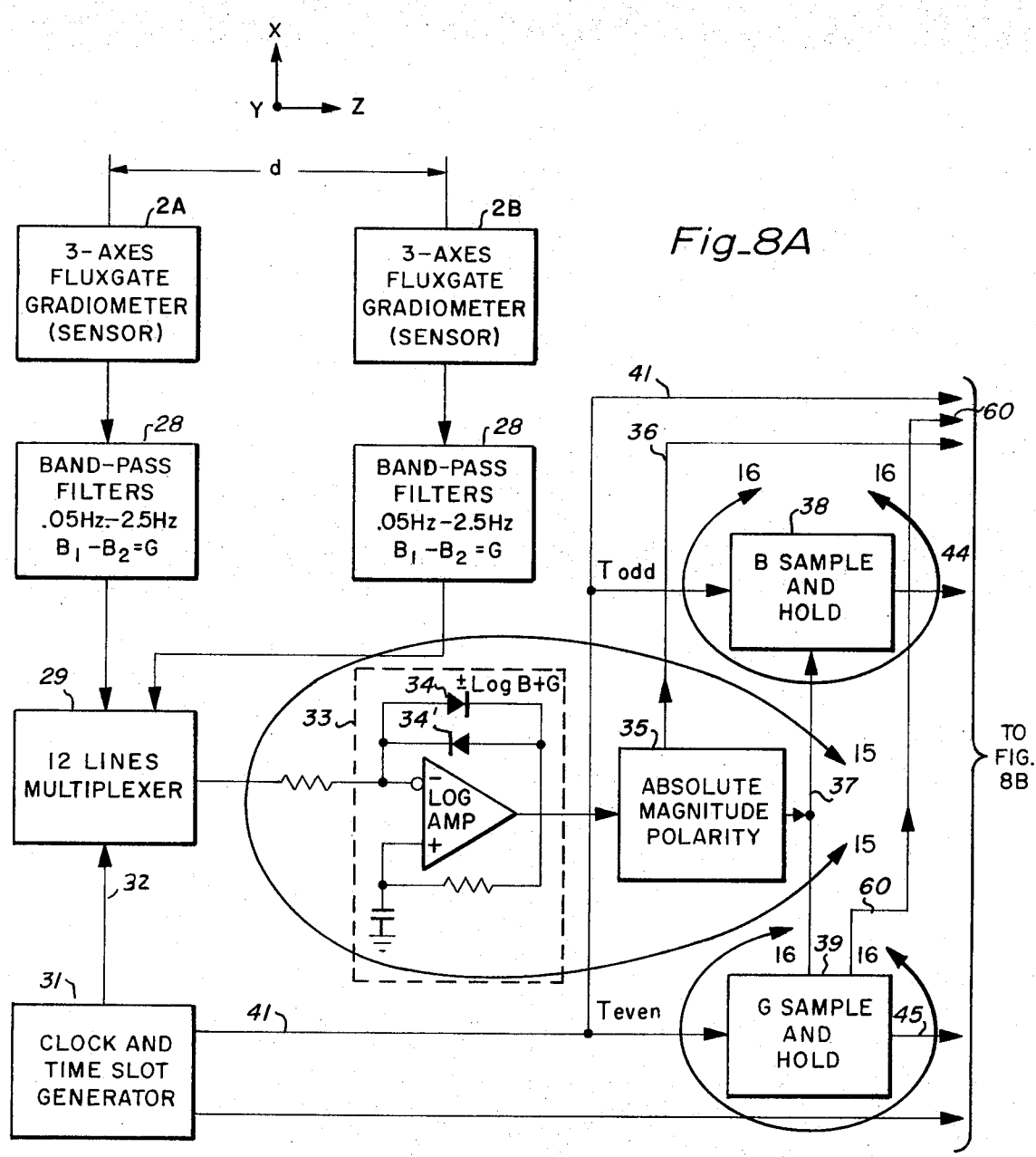
Fig_8A

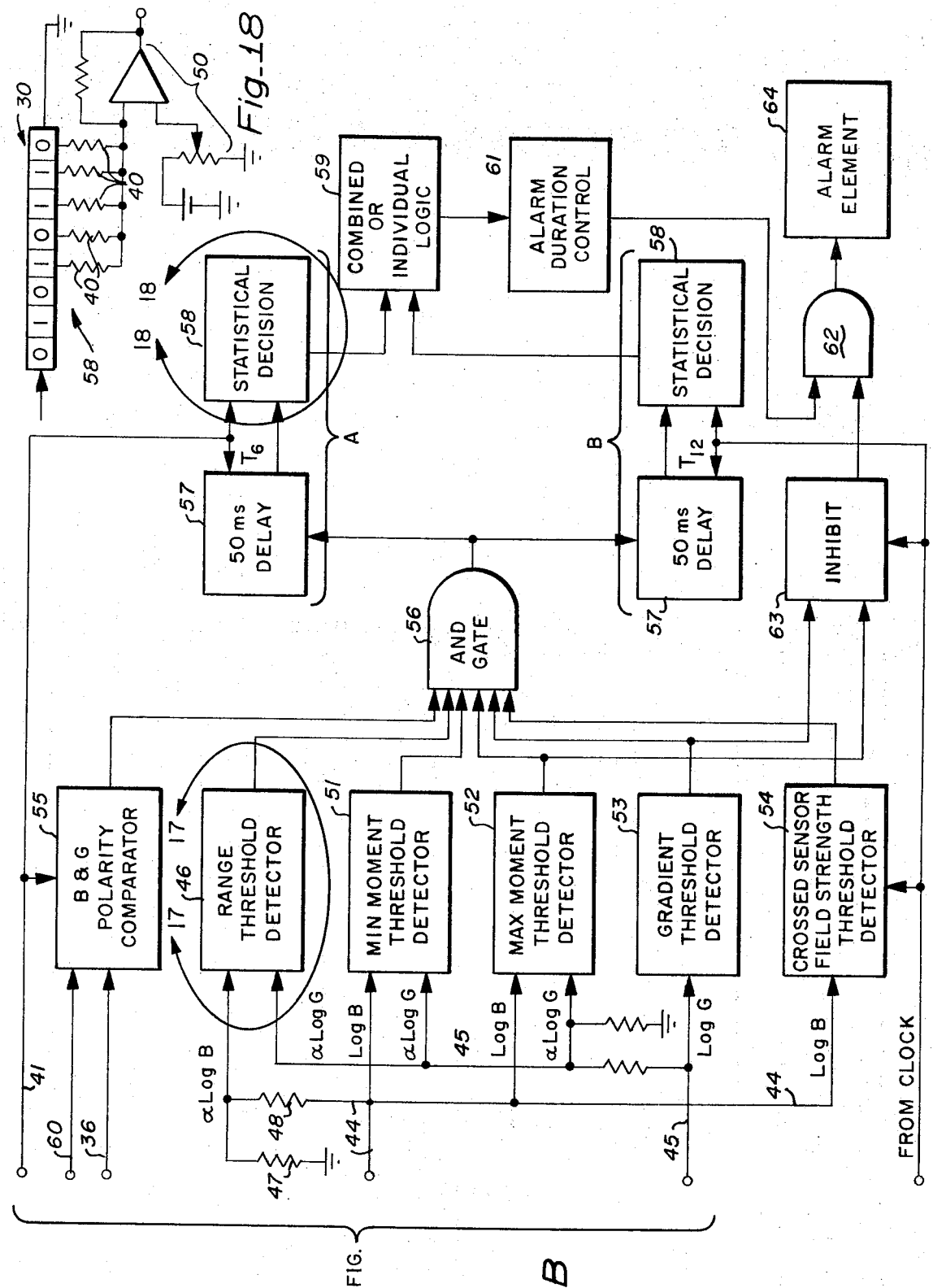

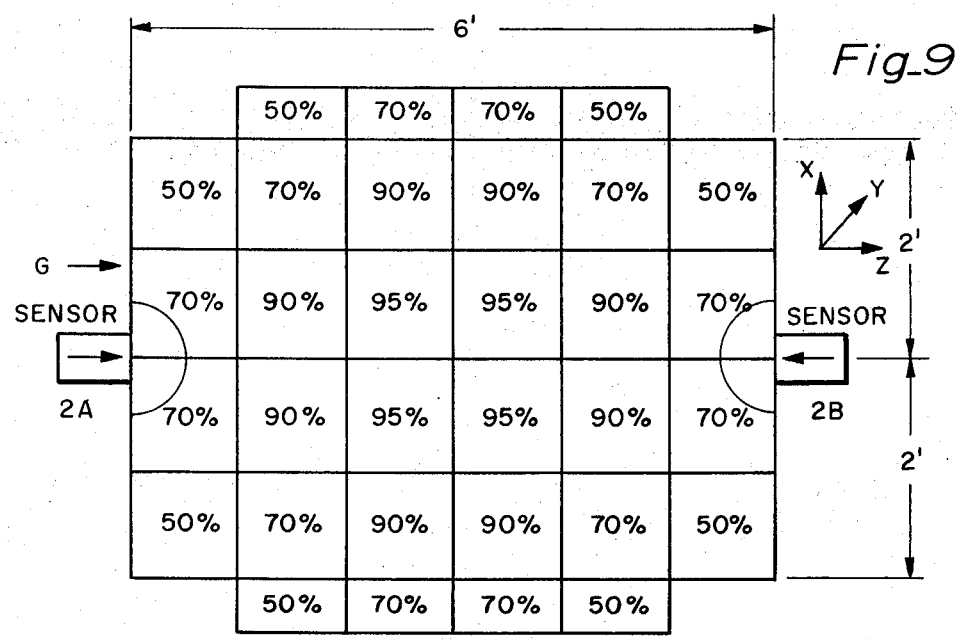
Fig_9
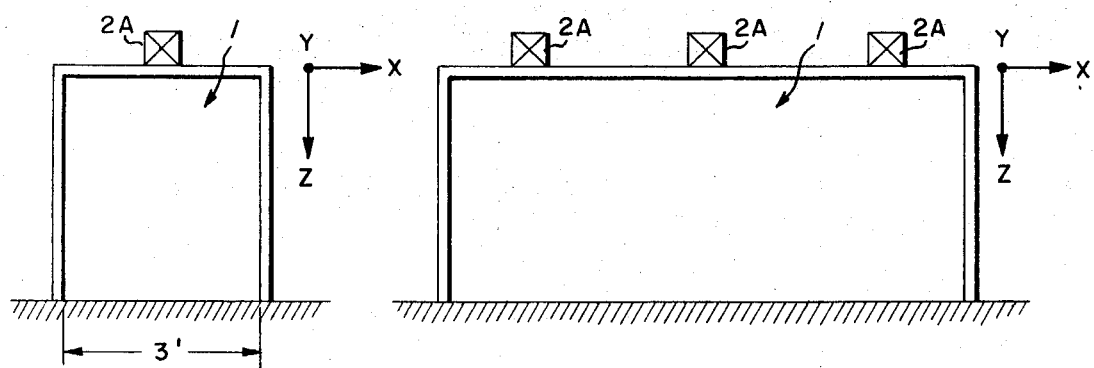
Fig_11    Fig_12
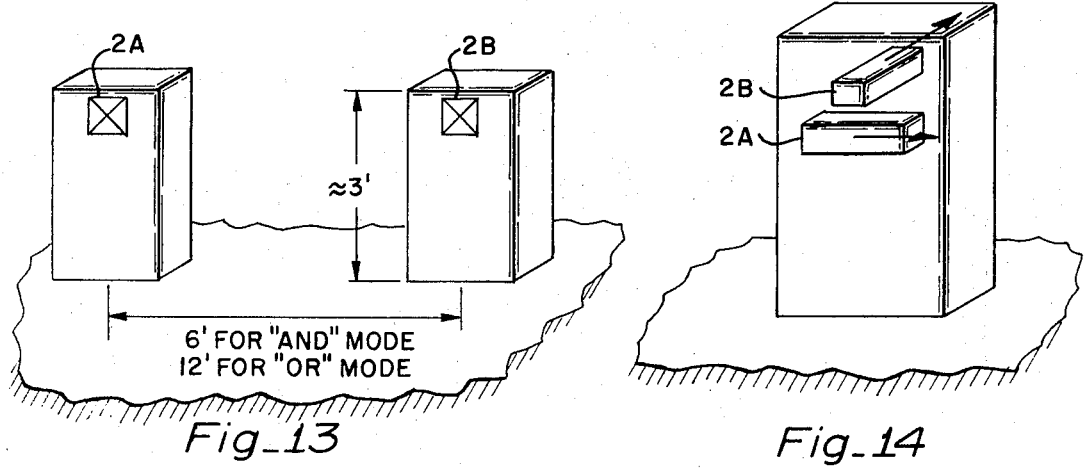
Fig_13    Fig_14

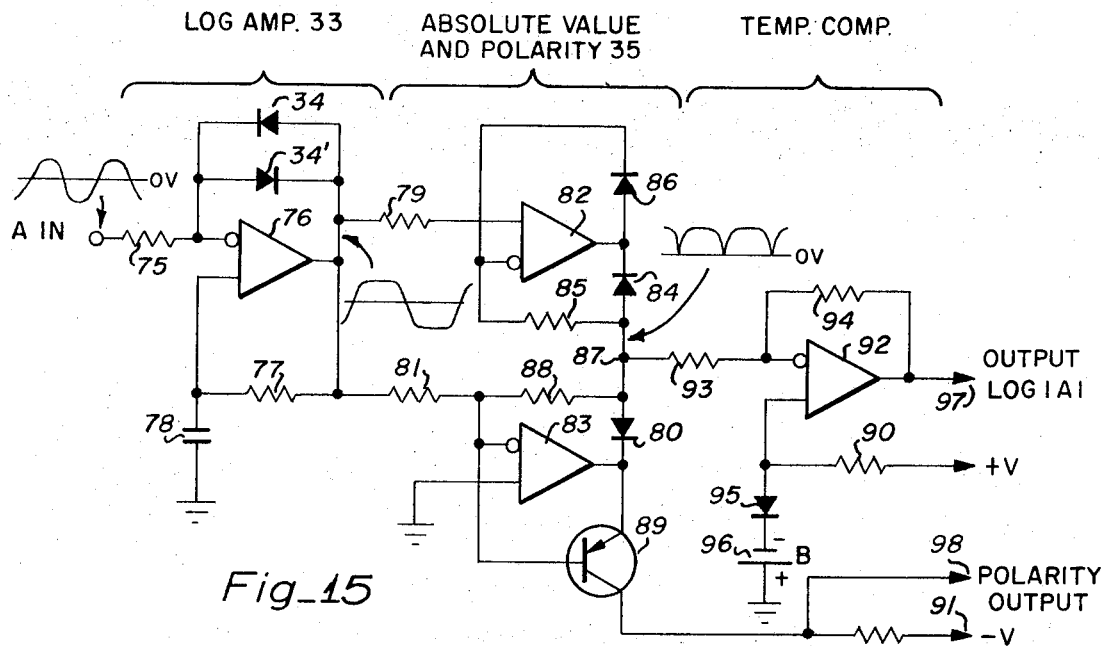
Fig_15
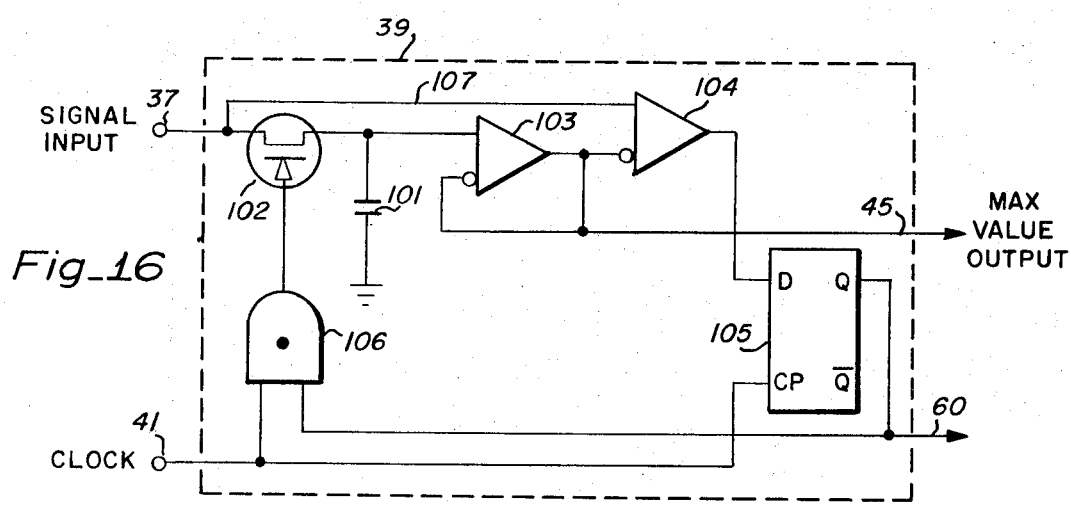
Fig_16
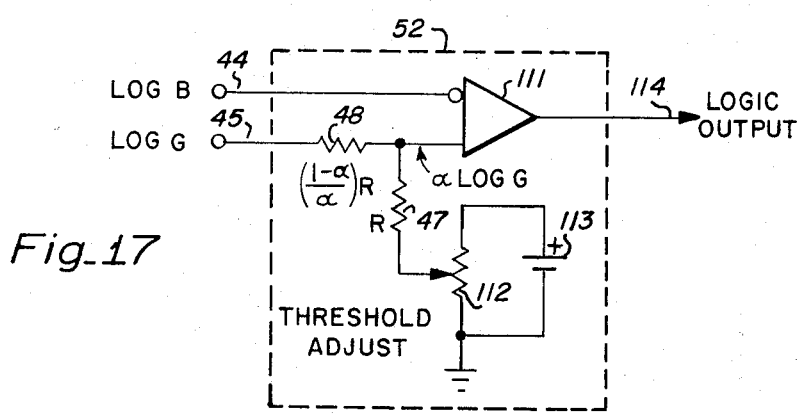
Fig_17

MAGNETIC DETECTION FOR AN ANTI-SHOPLIFTING SYSTEM UTILIZING COMBINED MAGNETOMETER AND GRADIOMETER SIGNALS

BACKGROUND OF THE INVENTION

Heretofore, anti-shoplifting systems employing magnetic detection have been proposed using magnetometer or gradiometer sensors for sensing the magnetic field associated with an object to be detected within an exit passageway. Such a system is disclosed in U.S. Pat. No. 3,292,080 issued Dec. 13, 1966. In the conventional magnetic detection system, conventional vector or scalar magnetometers have been employed as the basic sensor element. The sensors are usually installed in doorways or passageways to detect when magnets or magnetic materials pass through their monitoring space, or the sensor is transported past the suspected location of the magnetic object. The sensors may be used singularly, or in simple wide-spaced arrays in the vicinity of the region to be monitored; e.g., several sensors may be placed on each side of a doorway, and their outputs connected in phase opposition to provide a first order cancellation of ambient noise. Alternatively, a "fence" of multiple sensors in a line may be placed under a floor, in a ceiling, etc., and phased for noise cancellation, however, detection systems employing conventional magnetometers have serious operational limitations.

One of the problems with the prior art magnetic sensing system in that the detection sensitivity varies with the distance from the sensor. A strong magnet far from the sensor produces the same signal as a weak magnet close to the sensor, thus, threshold triggering levels cannot be firmly established. If a conventional system is adjusted to warn when weak magnets pass through the surveillance region, then the system can also trigger from nearby ferrous objects, resulting in false alarms. If the system threshold level is adjusted to eliminate false alarms from nearby ferrous objects, then weak magnets will be missed.

If multiple sensors are employed the variations of sensitivity with distance becomes even more severe, since the sensors are intentionally phased to cancel ambient field noise, and thus form a crude gradiometer. While the field strength of a dipole magnet (or virtually any object to be detected) various inversely as the cube of distance, the gradient varies inversely as the fourth power of distance. Thus a crude gradiometer system suffers from poor signal to noise ratio and short range.

Conventional magnetometers are nondirectional and they do not discriminate against objects to their rear, thus an equivalent space or even larger space must be reserved to the rear of the system employing only magnetometers. The ambient noise lever limits the lowest threshold that can be achieved without an objectional false alarm rate.

In multiple sensor arrays, the sensor axes must be accurately aligned in order to achieve noise cancellation. This is difficult to achieve, and more difficult to maintain, when the individual sensors are widely separated. Thus any rotation of one vector sensor with respect to another will produce a signal. Vibration is therefore likely to produce false alarms.

In the conventional systems the sensitivity of the system depends upon the orientation of the magnetic moment of the marker. In fact, any orientation can usually be found to which the system does not respond at all, giving a null zone. For the various foregoing reasons, conventional magnetometer and gradiometer sensing systems have not proven feasible for use as an anti-shoplifting system.

SUMMARY OF THE PRESENT INVENTION

The principal object of the present invention is the provision of an improved magnetic surveillance system useful as an anti-shoplifting system.

In one feature of the present invention, magnetic field sensors are disposed proximate a region to be monitored to derive first and second outputs, each being a function of different orders of the magnetic field to which the sensor is exposed. The first and second outputs are processed according to certain algorithms to derive third and fourth outputs which are a function of the magnitude of the magnetic moment of the magnetic anomaly and of the range from the sensor to the magnetic anomaly, respectively, whereby magnetic anomalies may be discriminated according to moment and distance from the sensor for substantially reducing the false alarm rate.

In another feature of the present invention, the magnetic sensor which is disposed proximate the region of space to be monitored senses both the intensity of the magnetic field and the gradient of the magnetic field in which the sensor is exposed. These magnetic field intensity and gradient outputs are processed according to prescribed altorithms to drive outputs proportional to magnetic moment of and range to the magnetic anomaly being detected.

In another feature of the present invention, the magnetic sensor for monitoring the region under surveillance comprises a three-axis fluxgate type magnetic sensor, whereby the magnetic detection system is rendered relatively insensitive to orientation of the magnetic moment to be detected.

In another feature of the present invention, the magnetometer and gradiometer outputs for different respective axes of the sensor are multiplexed to signal processing circuitry to derive outputs proportional to magnetic moment and range of the magnetic anomaly within the surveillance region, whereby the complexity of the signal processing circuitry is reduced.

In another feature of the present invention, the outputs proportional to magnetic moment and range of the magnetic anomaly are compared with reference magnetic moment and range quantities to derive analarm output only if the magnetic moment is within a certain range of values and the distance to the magnetic anomaly is within a certain prescribed range of distance, whereby false alarms are minimized.

In another feature of the present invention, a pair of magnetometer-gradiometer sensors are disposed to monitor a common surveillance region and outputs from both sensors are employed in deriving the alarm signal.

Other features and advantages of the present invention will become apparent upon a perusal of the following specification taken in connection with the accompanying drawings wherein:

BRIEF DESCRIPTION OF THE DRAWINGS

FIG. 1 is a front elevational view of a doorway having magnetic sensors mounted thereon in accordance with features of the present invention, FIG. 2 is a side elevational view of the structure of FIG. 1 taken along line 2—2 in the direction of the arrows, FIG. 3 is an enlarged perspective view of a three-axis fluxgate magnetometer and gradiometer sensor as employed in that portion of the system of FIG. 1 delineated by line 3—3, FIG. 4 is an enlarged perspective view, partly in block diagram form, of a single magnetometer three-axis sensor portion of the structure of FIG. 3 delineated by line 4—4, FIG. 5 is a perspective view of a magnetic marker, partially cut away to show the permanent magnet therein as employed in the system of the present invention, FIG. 6 is a plot of probability P that the magnetic moment $m$ of a magnetic anomaly in the surveillance region of a typical department store will have a magnetic moment greater than that value of magnetic moment indicated on the abscissa, FIG. 7 is a plot of the relative number of magnetic anomalies in normal department store traffic having a magnetic moment as indicated on the abscissa, FIGS. 8A and 8B comprise a schematic block diagram of a magnetic detection system incorporating features of the present invention, FIG. 9 is a plot of alarm possibility in percent superimposed upon the cross-sectional area of a passageway under magnetic surveillance utilizing the magnetic detection system of FIG. 8, FIG. 10 is a plot of probability of alarm vs. magnetic moment of the anomaly within the surveillance region for a magnetic detection system of the present invention employing four different sensors, namely, a two axis sensor, one three-axis sensor, two three-axis sensors, and two two-axis sensors, FIG. 11 is a front elevational view of a passageway showing the positioning of a sensor in a detection system of the present invention, FIG. 12 if a front elevational view of a passageway employing a plurality of magnetic sensors in accordance with the present invention, FIG. 13 is a perspective view of an alternative arrangement of sensors in accordance with the present invention, FIG. 14 is a perspective view of an alternative arrangement of magnetic sensors in an alternative system of the present invention, FIG. 15 is a schematic circuit diagram of that portion of the circuit of FIG. 8 delineated by line 15—15, FIG. 16 is a schematic circuit diagram for that portion of the circuit of FIG. 8 delineated by line 16—16, and FIG. 17 is a schematic circuit diagram of a typical threshold circuit portion of the circuit of FIG. 8 delineated by line 17—17, and FIG. 18 is a schematic circuit diagram for the statistical decision network portion of FIG. 8 delineated by line 18—18.

DESCRIPTION OF THE PREFERRED EMBODIMENTS

Detection of a magnetic object in an unknown location and orientation is greatly complicated by the very rapid, and nonlinear, decrease in field strength with distance. Along any radius, the field strength varies as $R^{-3}$ where R is distance from the source to the measuring point. Also the orientation of the field at the measuring point is a function of both the orientation and the direction from source to measuring point.

The system of the present invention circumvents the difficulties imposed by these facts of physics, and even uses them to advantage. More particularly, while the field strength varies as $R^{-3}$ the first gradient of the field strength varies as $R^{-4}$ the second gradient varies as $R^{-5}$, etc. If both field strength B and gradient G are measured by a sensor in the field of a magnetic moment M, the general form of these functions can be written (ignoring, for the moment, orientation geometry and common constants):

$$B = MR^{-3}$$

Eq. (1)

and $$G = MR^{-4}$$

Eq. (2)

These equations can be solved simultaneously for M and R, giving $$M = B^4 G^{-3}$$

Eq. (3)

and $$R = BG^{-1}$$

Eq. (4)

which demonstrates the ability of a single (field and gradient) sensor to determine both the moment and range of an unknown magnetic object. The complete solution including geometry is, of course, much more complex than the equations given above, but it can be shown that measurement of a field component and an appropriate gradient component of any order, or appropriate gradient components of two different orders, is necessary and sufficient to solve for moment and range. As used herein, the magnetic field intensity vector is the first order component of the magnetic field; the linear gradients are the second order components of the magnetic field; the quadratic gradients are the third order components of the magnetic field; etc.

It can also be shown that, for linear passage of a magnet or arbitrary orientation through the surveillance region, it is necessary and sufficient to measure two components of field and two related components of gradient to eliminate "null zones" in which detection will not occur.

In the present invention, as more fully disclosed below, each sensor (of which there may be several in an array) measures at least two field (preferably three field) and at least two (preferably three) related gradient components in a specified frequency band. Each field component and its associated gradient and treated as one channel for the purpose of computing estimates of M and R. An alarm is triggered only if the magnetic moment falls within a predetermined window of values and the range to that moment is less than some predetermined value. As will be more fully described below other criteria will also have to be satisfied before an alarm will be sounded in order to reduce the false alarm rate.

To facilitate simultaneous solution of nonlinear equations (3 and 4) the logarithms of the magnitude of B and G are first derived by log compression and full wave detection. Equations (1) and (2) can thus be transformed to $$b = \log B = \log (MR^{-3}) = \log M^{-3} \log R \quad \text{Eq. (5)}$$

$$g = \log G = \log (MR^{-4}) = \log M^{-4} \log R \quad \text{Eq. (6)}$$

which have linear solutions $$\log R = b - g \quad \text{Eq. (7)}$$

and $$\log M = 4b - 3g \quad \text{Eq. (8)}$$

Threshold detectors can then be set up to work at the desired log $R$ and log $M$ levels.

Referring now to FIGS. 1 and 2 there is shown a typical exit passageway of a department store or the like which it is desired to keep under magnetic surveillance to detect the unauthorized removal of a marking magnet of the type as shown in FIG. 5 as attached to a good or object the theft of which it is desired to detect. In a typical example, the passage 1 may have a width as of 6 feet and a height as of 8 feet. The magnetic detection system includes a pair of magnetometer-gradiometer sensors 2 disposed on opposite sides of a door frame 3 at a height of approximately 3 feet above the lever of the floor 4.

Each of the magnetometer-gradiometer sensors 2 includes a pair of three axis fluxgate magnetometer sensors 5 carried at opposite ends of a non-magnetic support rod 6 as of Lucite as shown in FIG. 3.

The three-axis fluxgate magnetometer-gradiometer sensor forms the subject matter of an is claimed in copending U.S. application Ser. No. 299,696 filed Oct. 24, 1972 and assigne to the same assignee as the present invention. Briefly, the three-axis fluxgate magnetometer sensor 5 is shown in FIG. 4 together with the associated circuitry for one magnetometer channel, such as the Y axis channel. The three-axis fluxgate sensor 5 includes a hollow cylindrical core 6 of a high magnetically permeability material such as Supermaloy commercially available from Dynacore, Inc.

The core is formed by winding five turns of the high permeability material tape as of 0.00025 inches thick with the width of the tape being equal to the length of the cylinder such length being approximately equal to the diameter of the cylinder. A driver winding 7 is wound on the core 6 with the magnetic axis of the winding 7 extending in a circle in the center of the core 6 and such circle lying in the X Y plane. In a typical example, the driver winding 7 comprises 100 turns of 34 AWG formvar insulated wire. X, Y and Z field sensing coils 8, 9 and 10, respectively, are wound around the core 6 with their magnetic axes corresponding to the X, Y and Z Cartesian coordinates, where Z is the axis of revolution of the cylinder 6.

The driver winding 7 is supplied with AC current from a driver source 11 at a convenient frequency of operation $f_1$, as of 100 kHz. The current through the driver coil 7 is sufficient to drive the core 6 into substantial saturation such as to produce a time varying permeability of the core 6 at twice the frequency of driving frequency $f_1$. As the core 6 is driven into saturation the permeability of the core 6 drops to very low value such that the magnetic field to which the core 6 is exposed does not permeate the core, whereas it will permeate the core when the core is not saturated. Thus, that component of the magnetic field to which the core 6 is exposed and which corresponds to one of the respective axes X, Y or Z will induce a signal in that respective field sensing winding at twice the driving frequency or $2f_1$.

The signal at $2f_1$ is extracted from the respective view sensing winding, such as the Y winding 9 and fed to one input of a phase sensitive detector 12 for phase sensitive detection with a reference signal derived from the driver 11 and doubled in doubler 13 and phase shifted in phase shifter 14 to produce a dc output signal at the output of phase sensitive detector 13 having a magnitude corresponding to the intensity of the Y component $B_y$ of the total magnetic field vector to which the core 6 is exposed. This dc output is amplified in amplifier 15 to produce an output on terminal 16. A portion of the dc output at terminal 16 is fed back to the respective winding 9 via feedback resistor 17 to produce a dc magnetic field vector of a magnitude to cancel or null out that component detector in winding 9. In this manner the sensor operates in a linear region of higher accuracy and stability.

Two such fluxgate sensor assemblies 5 are mounted at opposite ends of the sensor holder 6 with an axial separation in the Z direction of approximately 4 inches. The field sensing windings 7, 8 and 9 of the second core are connected in opposite polarities to those of the first core. The drive voltage from driver 11 supplies both cores with current excitation at the drive frequency $f_1$. The sensors 2 are adjustable both in elevation and azimuth by means of a bracket 21 which pivotably supports the sensor holder 6 to permit variations in elevation by pivoting the holder 6 about the pivot points 22 of the bracket 21. The bracket is also rotatable in azimuth about the vertical Y axis as indicated by arrow 23. The two sensors 2A and 2B are disposed on opposite sides of the passageway 1 and are aligned such that the sensor holders 6 are coaxially aligned along the Z axis.

Each sensor 2 is provided with 6 outputs. The first three outputs of each sensor 2 correspond to the X, Y and Z components ($B_x$, $B_y$, $B_z$) of the magnetic field of the magnetic moment sensed by the sensor 2. The second three outputs correspond to the difference between the dc outputs of the respective X, Y, and Z coil pairs, thereby producing gradient outputs approximately as follows:

$$\Delta B_x/\Delta z, \Delta B_y/\Delta z \text{ and } \Delta B_z/\Delta z.$$

Referring now to FIGS. 8A and 8B, there is shown, in block diagram form, a magnetic detection system as employed for anti-shoplifting. The goods to be protected are marked with a magnetic marker 25 of FIG. 5 which contains a standard Alnico V permanent bar magnet 26 having a standard magnetic moment. In a typical example, the magnet is ¼ × ¼ × 2 inches in length and produces a field of 0.05 gauss at 1 foot perpendicular to the magnet axis.

The pair of sensors 2A and 2B are disposed on opposite sides of the passageway 1 as shown in FIG. 1 and are aligned as previously described. The six outputs from each of the sensors 2A and 2B are fed to respective band pass filters 28 each having a pass band between 0.05 hertz and 2.5 hertz. The band pass filters 28 also include resistive networks for combining the outputs from the two sensors 5 to produce the gradient outputs. More particularly, the pair of $B_x$ signal outputs $B_{x1}$ and $-B_{x2}$ are combined through a pair of equal value resistors. The resultant signal, since $B_{x2}$ is derived from the winding poled opposite to that of $B_{x1}$ is a difference signal. This signal is proportional to a component of the gradient of the Bx component of the external field. In particular, using the coordinates defined in FIGS. 1–4 it is an approximation of $\Delta B_x/\Delta z$.

The band pass between 0.05 and 2.5 hertz is approximately optimum for an average range of walking speeds and the cutoff at zero frequency allows the system to ignore stationary objects and ambient earth's field.

The six line output from each of the band pass filters, each containing three sets of field and gradient signals, are fed to the input of a twelve line multiplexer 29 which is synchronized from a clock and time slot generator 31 via line 32. The time displaced outputs of the multiplexer 29 are fed to the input of a log amplifier 33 for log compression to derive a multiplexed output which is a series of time displaced ac voltages proportional approximately to the logarithm of the magnitude of the respective input components.

The logarithmic amplifier 33 is described in greater detail below with regard to FIG. 15. Briefly, however, the logarithmic amplifier 33 includes an ac amplifier having a pair of paralleled diodes 34 bipolar connected for feedback such that the logarithmic transfer function of the diodes produces a logarithmic transfer for the log amplifier 33. AC log signals at the output of the log amplifier 33 are fed to the input of an absolute magnitude and polarity determining circuit 35 which includes a full wave rectified for rectifying the respective log ac signals to derive absolute magnitude dc signals of one polarity and for determining the polarity (relative phase) of the respective log signals before rectification. The absolute magnitude and polarity determining circuit 35 is shown in greater detail in FIG. 15.

The polarity output signal is applied to line 36, whereas the absolute magnitude log output signals are taken out via output line 37. The multiplexed log signals are in the sequence of $B_x, G_x, B_y, G_y, B_z, G_z$ from sensor 2A followed by $B_x, G_x, B_y, G_y, B_z, G_z$ from sensor 2B and then the log signals corresponding to the log of the magnetic field intensity and gradients are fed via line 37 to a pair of sample and hold circuits, namely B sample and hold circuit 38 and G sample and hold circuit 39, which are more fully described in FIG. 16.

The B sample and hold circuit 38 is synchronized with the odd time slots corresponding to the field magnitude output signals via a synchronizing signal derived from clock 31 over line 41. In addition, the clock and time slot generator 31 also supplies a phase signal corresponding to each half cycle of the multiplex cycle of operation such that the circuit 38 sample and holds the maximum B signal from the 2A sensor at $T_6$ and then on the next half cycle of the multiplex sequence it holds at $T_{12}$ the maximum field component B derived from the 2B sensor. Likewise, the gradient sample and hold circuit 38 is synchronized via the output of the clock 31 to sample and hold the 2A sensor's gradient signal component G, on even time slots during the first half cycle of operation and the G output of the 2B sensor during the second half cycle. Thus at the output of the two sample and hold circuits 38 and 39, there appears on output line 44 of the B sample and hold 38 the maximum log B signal from the 2A sensor at the end of the first half cycle of the multiplexing cycle, namely at $T_6$ and the maximum log B signal at the termination of the second half of the multiplex cycle, namely $T_{12}$. Similarly, the output of the gradient sample and hold circuit 39 appears at output 45 and comprises at $T_6$ the maximum gradient signal log G derived from the 2A sensor and at $T_{12}$ the maximum gradient signal log G derived from the 2B sensor.

The output on lines 44 and 45 correspond to the maximum amplitude of the respective log B and log G signals, respectively, and are fed to a number of parallel connected threshold detectors via the intermediary of weighting and summing networks for carrying out the algorithms of Eqs. (7) and (8). More particularly, from Eq. 7 it is seen that the logarithm of the range R is equal to the logarithm of the field component minus the logarithm of the gradient component. Accordingly, a range threshold and detector circuit 46, more fully disclosed below with regard to FIG. 17, has an input circuit with resistors of equal value for subtracting the log inputs from line 44 and 45 to derive the difference which is then compared with a reference threshold signal lever determinative of the maximum range within which it is desired to detect a standard magnet.

In the case of the sensors 2A and 2B disposed on opposite sides of the doorway 1, as shown in FIGS. 1 and 2, the maximum range reference is ascertained empirically by moving a standard magnet through the passageway at the desired maximum range. The reference value is then set which will yield a "false" output for the range threshold detector 46. Thus if the difference signal corresponding to the range at the input to the threshold detector 46 is greater than the desired reference range, a "false" signal is derived at the output of the threshold detector 46.

A voltage divider network, consisting of resistors 47 and 48 of values R and $(1-\alpha/\alpha)$ R, respectively, are connected into each of the output lines 44 and 45 for weighting the respective log signals by the weighting factor or ratio $\alpha$. With regard to the inputs to the range threshold detector 46, since both log inputs were weighted by the factor $\alpha$ the weighting factor cancels out to conform to the algorithm of Eq. (7).

Likewise the log B and $\alpha$ log G inputs are applied to the input of a minimum moment threshold detector 51 such threshold detector being substantially the same as that of the range threshold detector 46 except that the weighting of the two inputs is such as to carry out the algorithm of Eq. (8). The reference input to the moment threshold detector 51 is determined emperically by passing a magnet having the minimum moment to be detected through the passageway 1 such that the output of the moment detector 15 produces a false output if the detected moment does not exceed the threshold reference value.

A similar maximum moment threshold detector 52 receives log B and $\alpha$ log G inputs and the threshold reference input is set for the maximum moment to be detected as derived emperically by calibrating the system with a magnet having the maximum moment to be detected, as of two or three times the magnetic moment of the standard magnet. The output of the maximum moment detector 52 is a false output if the input exceeds the reference.

The log gradient signal log G derived from line but is fed to the input of a gradient threshold detector 53 which is substantially the same as that of the range threshold detector 46 with the exception that only one input log signal is employed. The respective gradient log signal is compared with a minimum gradient reference signal derived emperically by passing the standard magnet through the passageway 1 in a region just inside the passageway and above or below the respective sensor 2A or 2B by the maximum vertical spacing to be detected. In this region the standard magnet produces at the sensor a substantial magnetic field component by produces a very low gradient value. The output of the gradient threshold detector 53 is a false signal if the detected gradient input does not exceed the reference level. The log B signal is inputted to a field strength threshold detector 54, similar to the detector of 53, wherein the threshold level is set for a minimum magnetic field intensity derived from passing the standard magnet through the passageway 1 at approximately midway between the sensors, i.e., a little over 3 feet with a 6 foot wide passageway between sensors 2A and 2B. This discriminates against interference signals of a value less than the standard magnet at 3 feet. This test is only employed when both sensors 2A and 2B are used. The output is "false" when neither sensor 2A or 2B has a signal of a value above the reference value. A single flip-flop in the output of the threshold detector 54 stores true output if either sensor has an output above the reference. Clock pulses at $T_6$ and $T_{12}$ synchronize the test with the respective outputs of the two sensors 2A and 2B. Thus the output of the flip-flop is delayed by one half cycle of the multiplex cycle.

The polarity output on line 36 is fed to a polarity comparator 55 which compares the polarity of the magnetic field component signal $B_x$, $B_y$, $B_z$ with the polarity of the respective gradient signal $G_x$, $G_y$, $G_z$ to derive the direct outputs at $T_6$ and $T_{12}$ which are false it B and G at maximum G are of opposite polarity. More particularly, it can be shown that B and G will be of the same polarity when the magnetic moment being detected is located in the positive Z direction, i.e., toward the center of the passageway relative to the individual sensors 2A and 2B. A magnetic object on the opposite side of the respective sensor will produce field and gradient signals of opposite polarity. Thus, the polarity comparator 55 gives a direction output component for discrimination against magnets or magnetic anomalies outside of the passageway 1.

The B & G polarity comparator 55 accepts the polarity signal from the absolute magnitude and polarity circuit 35 and generates a ture output if the B and corresponding G have the same sign, i.e., if $B_x$ and $G_x$ have the same sign, then a true output is generated, if $B_y$ and $G_y$ have the same sign, then a true output is generated, and so forth. A polarity comparison is therefore performed for each of the X, Y, and Z field components but only the sign which corresponds to the component that has the greatest G is actually used at the output of the polarity comparator at $T_6$ and $T_{12}$. This is accomplished in the following manner: the B sign is sampled via line 36 and stored in a flip-flop and then compared with the corresponding G sign (the next bit); if the signs are the same, a true output is obtained and stored in a second flip-flop and is outputed to the AND gate, 56; however, new sign data (the next B-G comparison) is allowed to update the output flip-flop only if the G for that sign is greater than previous stored samples, as determined in the G sample and hold circuit 39 supplied over line 60.

The output from the comparators 46 and 51–55 are fed to the input of an AND gate 56 to produce a true output at times $T_6$ and $T_{12}$ corresponding to when the sensors 2A and 2B have detected the presence of a magnetic moment satisfying the requirements of the various threshold detectors and comparators 46 and 51–55. The output of the AND gate 56 is fed to the input of a pair of parallel channels, namely channels A and B, respectively. Each channel includes a 50 millisecond delay circuit 57 which allows the signal to build up. the output of the delay is gated at times $T_6$ and $T_{12}$ is respective channels A and B to respectively statistical decision networks 58, as shown in greater detail in FIG. 18.

The statistical decision network 58 includes a shift register 30 wherein the respective true and false outputs at times $T_6$ and $T_{12}$ in the respective channels are consecutively stored. The outputs of the shift register 30 in a number of positions such as, for example, the last five positions is monitored and summed via summing resistors 40 and fed to a threshold detecting circuit 50 such that a certain minimum number of hits or true outputs from the 2A sensor are required out of the number of consecutive outputs being monitored. For example, in the case five consecutive A channel readings are being examined, for example, at least three of such five may be required to be true in order for the output of the statistical decision network 58 to be true.

Likewise, in channel B the statistical decision network 58 examines successive outputs from the 2B sensor to derive a true output if a certain number of outputs are true out of the number being examined. The A and B outputs of this statistical decision networks 58 are fed to an X and/or logic network 59 which will give a true output depending upon whether network 59 is set for the AND mode or the OR mode. More particularly, the output of logic circuit 59 will be true in the AND mode if the outputs of decision networks 58 in channels A and B are both true, whereas the output of logic network 59 in the OR mode will be true if either one of the outputs from the statistical decision networks 58 are true in channels A or B.

A true output of logic circuits 59 is fed to an alarm duration control circuit 61 and thence to an AND network 62 for comparison with the output of an inhibit network 63 which is connected to the output of the maximum moment threshold detector and gradient threshold detector 53 to derive a false inhibit output of a relatively long duration as of 10 to 15 seconds if either sensor 2A or 2B detects an excessive magnet moment and a true gradient long duration as of 10 to 15 seconds if either sensor 2A or 2B detects an excessive magnetic moment and a true gradient output that may be occasioned by the passage of a stroller or other relatively large magnetic moment through the passageway. The inhibit network 63 is synchronized by an output derived from clock 31 for checking the output of sensors 2A and 2B at times $T_6$ and $T_{12}$. The output of the inhibit network 63 is fed to the other input of the gate 62 to inhibit passage of the alarm signal to an alarm element such as a horn or light 64.

Thus, an alarm is actuated whenever a magnetic moment is sensed in passage through the passageway which is within the desired selected window of values of magnetic moments which would include the standard magnet and which is within a desired range and direction from the sensors; provided, that the alarm has not been inhibited by sensing of a large magnetic moment and large gradient as would be produced by a stroller or the like.

Referring now to FIGS. 6 and 7 it is shown that only approximately 1 percent of magnetic objects typically passing through an exit passageway in the clothing department of a department store would have a magnetic moment greater than that of the standard magnet. And FIG. 7 shows that less than 1/10 of 1 percent of such objects would have a magnetic moment within 0.5 to 2.0 times the magnetic moment of the standard magnet. Thus, the ability of the present circuit to discriminate against magnets falling outside of the window of magnetic moment greatly reduces the false alarm rate as would otherwise be encountered by detection of relatively weak magnetic moments or of moments substantially larger than that of the standard magnet.

Referring now to FIG. 9 there is shown a pattern of probability of detection of a standard magnet vs. the cross-sectional dimensions of a passageway 1 between sensors 2A and 2B for the system of FIGS. 1–2 and 8 employing a pair of three-axis fluxgate sensors 2A and 2B connected for the AND mode of operation in logic circuit 59.

Referring now to FIG. 10 there is shown a plot of probability of achieving alarm vs. magnetic moment for the magnetometer-gradiometer detection system of the present invention employing different numbers of detectors and different kinds of detectors. For example, solid curve 71 shows the probability of alarm for a pair of three-axis sensors 2A and 2B, whereas curve 72 shows the probability of achieving an output alarm utilizing only one three-axis sensor and curve 73 shows the probability of alarm utilizing two two-axis sensors and curve 74 shows the probability of alarm using only one two-axis sensor. As can be seen from the plot of FIG. 10 the ability of the detection system to discriminate against magnets outside the range of the standard magnet is greatly increased by utilizing a three-axis sensor and substantially improved by using at least two three-axis sensors monitoring a common region.

Referring now to FIG. 11 there is shown an alternative arrangement on the magnetic sensor 2A wherein the sensor 2A is mounted above the passageway 1 with the Z axis pointing downwardly.

Referring now to FIG. 12 there is shown an alternative arrangement similar to that of FIG. 11 wherein a plurality of sensors 2A are spaced across the passageway 1, each being directed down to cover a portion of the passage 1 whereby wider passageways may be monitored.

Referring now to FIG. 13 there is shown an alternative arrangement of sensors 2A and 2B wherein the sensors are mounted in pillars defining passageways therebetween.

In an alternative embodiment as shown in FIG. 14, sensors 2A and 2B are mounted in a pillar with the Z axis of each of the sensors being orthogonally directed in the horizontal plane to gain cross-sensor coverage for a radius in all directions from the pillar.

Referring now to FIG. 15, there is shown the log amplifier circuit 33 and absolute magnitude and polarity determining circuit 35. Amplifier 33 includes an input resistor 75 through which the ac signals from the output of the multiplexer 29 are applied to the input of an amplifier 76. A pair of silicon semiconductive diodes 34 and 34' are connected as feedback around the amplifier 76 and have opposite polarity to provide a logarithmic transfer characteristic for both positive and negative polarity input signals applied to the input of amplifier 76.

A stabilization circuit is incorporated comprising feedback resistor 77 and bypass capacitor to ground 78 to provide a very low amplifier offset at dc. This is important to provide identical response for positive and negative going signals. Additionally, it is important that the characteristics of the two diodes 34 have matched characteristics. The matched characteristics are assured, for example, by using diodes that have been manufactured on one semiconductor substrate, i.e., a monolithic device.

The variation in diode characteristics to temperature can be compensated within the log amplifier 76. However, in the instant case, temperature compensation is provided by a temperature compensating circuit at the output of the absolute value and polarity circuit 35, as temperature compensation at this point is more easily achieved with fewer circuit elements as more fully described below.

The output of amplifier 76 is fed via coupling resistors 79 and 81 to the input of a pair of amplifiers 82 and 83, respectively. Whenever the signal at the output of amplifier 76 is positive, the output of non-inverting amplifier 82 goes positive thereby back biasing diode 84 for blocking an output to node 87 and the positive going output of amplifier 82 is clamped to the other input terminal of the amplifier via clamping diode 86. However, at the same time the inverting amplifier 83 responds negatively providing an output signal through diode 80 at node 87 which is equal to the ratio of resistors 88 and 81 times the input signal. For negative input signals at the output of amplifier 76, amplifier 82 provides an output equal to the input signal and amplifier 83 provides essentially no output since diode 80 is back biased. In this way an output is generated at node 87 which is equal in magnitude to the input signal but always negative in polarity, provided that the resistance of resistor 81 and resistor 88 are equal.

Clamping diode 86 prevents the output of amplifier 82 from excessive excursion for positive input signal and a transistor 89 connected between the output of amplifier 83 and the source of the negative potential 91 prevents the output of amplifier 83 from excessive excursions for negative input signals. The collector output of transistor 89 provides an output signal that represents the polarity of the input signal at the output of amplifier 76. For positive input signals, the polarity output signal will be approximately equal to $-V$. For negative input signals, the polarity signal will be approximately zero volts.

The output of the absolute value circuit 36 at node 86 is applied to the input of inverting amplifier 92 via coupling resistor 93. The output of amplifier 92 is equal to the input at node 87 times the ratio of value of resistances of resistor 93 and feedback resistor 94 connected around amplifier 92. In addition, temperature compensation is applied to the non-inverting input of amplifier 92. This temperature compensation is provided by the forward biased diode 95 whose voltage temperature coefficient behaves in a well-known manner and can be adjusted by varying the amount of forward biased current by varying resistor 90. A battery 96 is incorporated to cancel the voltage offset introduced by the diode 95. Thus the output at terminal 97 corresponds to the logarithm of the magnitude of the input signal and the polarity output derived from terminal 98 is either a zero of 1 dependent upon the polarity of the particular half cycle of the input signal.

Referring now to FIG. 16 there is shown one of the maximum value sample and hold circuits, namely 39. The circuit includes a storage capacitor 101 on which the input signal is stored as gated via unijunction transistor 102. The voltage appearing on the storage capacitor 101 is fed to one input of a buffer non-inverting amplifier 103. The output of the buffer amplifier 103 is fed to the inverting input of amplifier 104 and also serves as the maximum value output applied to terminal 45. The output of the second amplifier 104 is fed to the D input of a delay flip-flop 105 and the Q output of the flip-flop is fed to AND gate 106 which controls the unijunction transistor gate 102. The synchronizing clock input signals are applied via line 41 to the gate 106 and to the flip-flop 105. The input signal on line 37 is fed directly to one input of amplifier 104 via line 107.

In operation, the maximum value circuit 39 is used to determine which of the three gradient signals from the sensor is the greatest in value and then holds this value for calculation of magnetic moment, range, etc. The circuit shown will determine the maximum value of the series of data samples presented to its input 37 regardless of what order the samples are applied.

The circuit operates in the following manner: Assume that capacitor 101, which stores the sample data, is initially discharged to zero. If a signal is applied to the input 37 which is larger than that stored on the capacitor 101 at the time of the clock signals derived from line 41, the output of amplifier 104 goes high and the D input to the flip-flop is high and then the output Q of flip-flop 105 will be clocked high. With the clock high and Q high, the AND gate 106 provides a high output which closes the gating transistor 102 and charges capacitor 101 to the new higher signal level. If, on the other hand, the input signal is lower than that stored on the capacitor 101, the output of amplifier 104 will be low and the Q output of flip-flop 105 will be clocked low and the output of the AND gate will be low and gating transistor 102 will not close and the signal stored on capacitor 101 will remain unchanged. Buffer amplifier 103 provides a buffered output to the max value output line 45 without discharging capacitor 101.

The clocked Q output is fed via line 60 to the input of the B and G polarity comparator 55 for use in selecting the maximum gradient component for polarity determination as previously described with regard to FIG. 8B.

Referring now to FIG. 17, there is shown a typical threshold detector circuit 52. The circuit includes a differential amplifier 111 having the log B input signal applied to one input terminal thereof via line 44 and having the $\alpha$ log G input signal applied to the other input terminal thereof via line 45 and the attenuating voltage divider network consisting of resistors 47 and 48. A threshold adjust circuit is provided by an adjustable potentiometer 112 supplied with potential from a battery 113 and connected between resistor 47 and ground for applying an adjustable potential in circuit with the $\alpha$ log G input to the amplifier 111. The threshold adjust potentiometer 112 is adjusted such that the output of amplifier 111 is normally "true" until the difference between the log B and $\alpha$ log G inputs achieve a predetermined maximum value at which time the difference exceeds the threshold adjust value produced by potentiometer 112 to produce a false output at terminal 114. Theoretically one can calculate the range and moment of a distant dipole with great precision using the measured values of B and G and exact mathematic equations. However, to obtain a suitable approximate answer with simple electronic circuitry is highly desirable. Two approximations have been considered and evaluated which give suitable approximations of magnetic moment and range. The first approximation utilizes a measurement of the RMS (root means square) of the three magnetic field components and of the three gradient components, whereas the second approximation simply selects the component of magnetic field and gradient which has the greatest value, as employed in the system of FIGS. 8A and 8B. The first method gives a more accurate approximation but the second is implemented with simpler hardware. It is significant that one can get a good approximation to range and moment by simply utilizing the maximum valued component of magnetic field and of gradient.

What is claimed is:

1. In an anti-shoplifting apparatus employing magnetic detection of a magnetic marker affixed to an object for detection of unauthorized passage of the magnetically marked object through a surveillance station:
    sensor means to be disposed proximate the region to be monitored for sensing the magnetic field of the magnetic marker to which said sensor is exposed to derive first and second outputs, said first output being a function of a first component of the magnetic field of the marker of a certain magnetic order, said second output being a function of a second component of the field of the magnetic marker of a magnetic order higher than that of said first magnetic field component;
    means responsive to said first and second outputs to derive third and fourth outputs, said third output being a function of the magnitude of the magnetic moment of the magnetic field component produced by the marker, if any, to which said sensor means is exposed, and said fourth output being a function of the range from said sensor means to said magnetic marker.

2. The apparatus of claim 1 wherein said sensor means includes a pair of magnetic sensors spaced apart to derive said first and second outputs, and wherein said first output is proportional to the magnitude of a magnetic field intensity component of the magnetic marker to which said sensor means is exposed, and wherein said second output is proportional to the magnitude of a gradient component of the magnetic field intensity component of the magnetic marker to which said sensor means is exposed.

3. The apparatus of claim 2 wherein said pair of magnetic sensors are each fluxgate type magnetic sensors, and means for taking the difference of the outputs of said pair of spaced fluxgate sensors to derive said second output.

4. The apparatus of claim 1 wherein said sensor means includes, means for sensing said first component of the magnetic field of the marker in a plurality of different directions, and means for selecting the largest one of said plurality of sensed components as said first output.

5. The apparatus of claim 1 wherein said sensor means includes, means for sensing said second component of the magnetic field of the magnetic marker in a plurality of different directions, and means for selecting the largest one of said plurality of sensed components as said second output.

6. The apparatus of claim 2 wherein said means responsive to said first magnetic field intensity output and said second magnetic field gradient output to derive said third and fourth outputs includes, means responsive to said first and second outputs to derive respective logarithmic outputs proportional to the respective logarithms of the amplitudes of said first and second outputs, and means for taking the difference of said pair of logarithmic outputs to derive said fourth output which is a function of range.

7. The apparatus of claim 2 wherein said means responsive to said first magnetic field intensity output and said second magnetic field gradient output to derive said third and fourth outputs includes, means responsive to said first and second outputs to derive respective logarithmic outputs proportional to the respective logarithms of the amplitudes of said first and second outputs, and means for differently weighting said respective first and second logarithmic outputs according to the ratio of more parts of said first logarithmic output than the parts of said second logarithmic output, and means for taking the difference of said weighted first and second logarithmic outputs to derive said third output which is a function of the magnitude of the magnetic moment of the field to which said sensor is exposed.

8. The apparatus of claim 1 including, means for comparing said third output, which is a function of the sensed magnetic moment, with a reference determinative of a minimum magnetic moment to be detected to derive an output determinative of whether the sensed magnetic moment is greater than or less than the reference minimum magnetic moment.

9. The apparatus of claim 1 including, means for comparing said third output, which is a function of the magnitude of the sensed magnetic moment, with a reference determinative of a maximum magnetic moment to be detected to derive an output determinative of whether the sensed magnetic moment is greater than or less than the reference maximum magnetic moment to be detected.

10. The apparatus of claim 1 including, means for comparing said fourth output, which is a function of range to the sensed magnetic moment, with a reference determinative of maximum range to be detected to derive an output determinative of whether the range of the sensed magnetic moment is greater than or less than the reference maximum range to be detected.

11. The apparatus of claim 2 including, means for comparing said gradient second output with a reference determinative of the minimum gradient to which the system is to be responsive to derive an output determinative of whether the gradient of the sensed magnetic field component is greater than or less than the reference minimum gradient to be detected.

12. The apparatus of claim 1 including, means for comparing said third and fourth outputs with respective reference quantities determinative of minimum and maximum magnetic moment and maximum range to derive three respective fifth outputs determinative of whether the sensed magnetic moment is within a prescribed range of values and whether the range to the sensed magnetic moment is less than a prescribed value, and means responsive to said three respective fifth outputs for deriving a sixth output indicative of whether the sensed magnetic moment is within a predetermined prescribed window of magnetic moment value and the range to the sensed magnetic moment is less than a predetermined value.

13. The apparatus of claim 12 including, means for sequentially sampling and storing said sixth output, and means for analyzing the sequence of said stored sixth outputs to derive a seventh output when a certain predetermined number of said stored sixth outputs are true within a predetermined sequence of a given number.

14. The apparatus of claim 1 wherein said sensor means includes a pair of sensors disposed proximate the region of space to be monitored and each producing a respective pair of said first and second outputs derived from said common region of space under surveillance, means for multiplexing said respective pairs of said first and second outputs to said means responsive to said first and second outputs to derive multiplexed respective pairs of said third and fourth outputs, and means for comparing said multiplexed respective pairs of third and fourth outputs with reference quantities determinative of minimum and maximum magnetic moment and maximum range to derive three pairs of multiplexed respective fifth outputs determinative of whether the respectively sensed magnetic moment is within a prescribed range of values and whether the range to the sensed magnetic moment is less than a prescribed value, and means responsive to said pair of three respective fifth outputs for deriving a respective pair of sixth outputs indicative of whether the sensed magnetic moment as sensed by the respective sensor is within a predetermined prescribed window of values and the range to the sensed magnetic moment is less than a prescribed value.

15. The apparatus of claim 14 including, means for sequentially sampling and storing said pair of sixth outputs, and means for analyzing a sequence of said stored sixth outputs to derive a seventh output when a certain predetermined number of said stored sixth outputs fall within a predetermined sequence of a given number.

16. The apparatus of claim 15 including, means for comparing said respective pairs of said first outputs with a reference quantity corresponding to a sensed first output produced by a referenced magnetic moment disposed generally centrally of the common region of space under surveillance and generally midway between said pair of sensors to derive an additional fifth output determinative of whether at least one of said pair of sensors has a first output of a magnitude greater or less than said compared reference quantity, and wherein said means for producing said sixth output is also responsive to said additional fifth output.

17. The apparatus of claim 13 including, means responsive to a "false" output of said third output comparator means for inhibiting said seventh output for several seconds.

18. The apparatus of claim 17 wherein said second output is proportional to a gradient component of a magnetic field vector component to which said sensor is exposed and including, means for comparing said gradient second output with a reference determinative of the minimum gradient to which the output of the system is to be responsive to derive an output determinative of whether the sensed gradient component is greater than or less than the gradient reference, and wherein said inhibiting means is additionally responsive to a true output of said second gradient output comparator means for inhibiting said seventh output for several seconds.

19. The apparatus of claim 12 including, means responsive to said first and second outputs to derive a polarity signal output determinative of the direction to the sensed magnetic moment from said sensor means, and wherein said means responsive to said fifth output for producing said sixth output is additionally responsive to said polarity signal output for causing said sixth output to be false when said sensed magnetic moment is not in a predetermined selected direction relative to said sensor means.

20. The apparatus of claim 3 wherein each of said fluxgate magnetic sensors includes, a pair of magnetic field sensing windings having their respective magnetic axes substantially angularly displaced relative to each other.

21. The apparatus of claim 20 wherein said magnetic axes of said field sensing windings are orthogonally displaced.

22. The apparatus of claim 3 wherein each of said fluxgate magnetic sensors includes, three magnetic field sensing windings having their respective magnetic axes orthogonally angularly displaced relative to each other.

23. In a magnetic surveillance system for selective detection of magnetic moments of a predetermined magnitude within a surveillance region:

sensor means to be disposed proximate the region to be monitored for sensing the magnetic field to which said sensor is exposed to derive first and second outputs, said first output being a function of a first component of the magnetic field of a certain order, said second output being a function of a second component of the field of an order higher than that of said first component;

means responsive to said first and second outputs to derive third and fourth outputs, said third output being a function of the magnitude of a magnetic moment of a magnetic field, if any, to which said sensor means is exposed, and said fourth output being a function of the range from said sensor means to said magnetic moment.

* * * * *